Aug. 25, 1970　　　　　　G. J. VIOLLET　　　　3,525,118
COMPRESSED AIR VACUUM AND BLOW GUN APPARATUS
Filed Aug. 5, 1968
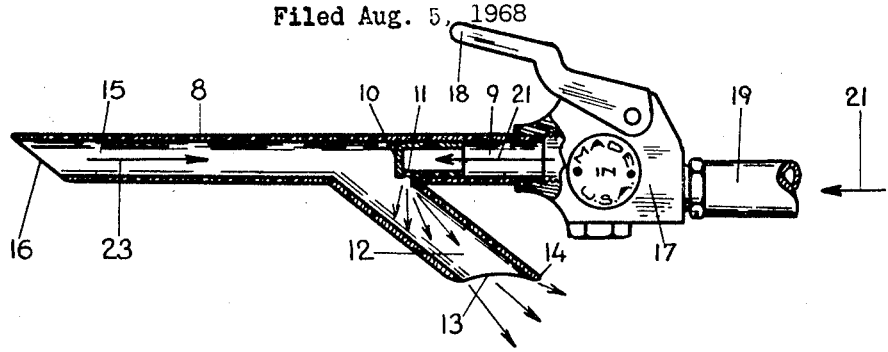
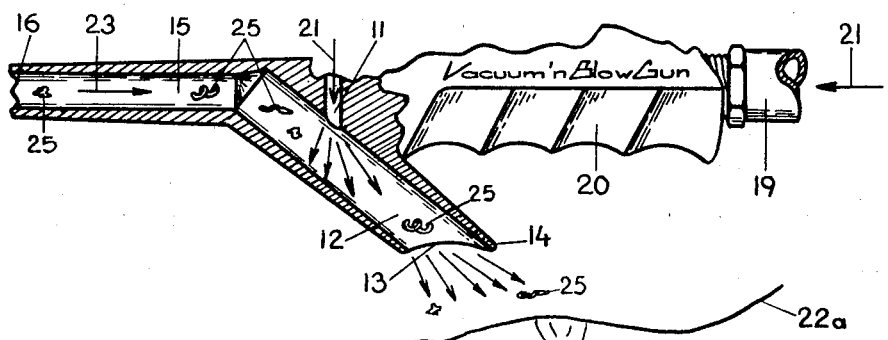
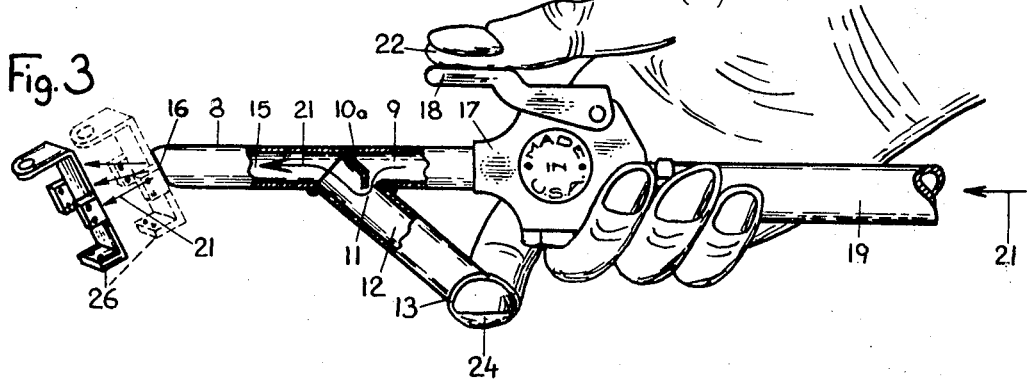
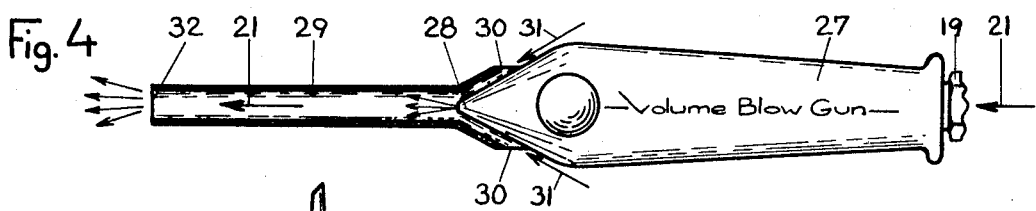
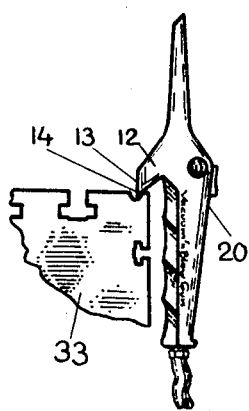
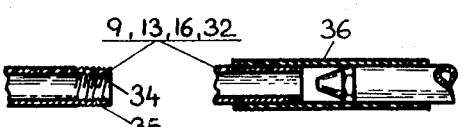
Inventor
Gerard Viollet United States Patent Office 3,525,118
Patented Aug. 25, 1970

3,525,118
COMPRESSED AIR VACUUM AND BLOW
GUN APPARATUS
Gerard J. Viollet, 1619½ W. 134th St.,
Gardena, Calif. 90249
Filed Aug. 5, 1968, Ser. No. 750,370
Int. Cl. F41b 11/00, 11/04
U.S. Cl. 15—330                    2 Claims

ABSTRACT OF THE DISCLOSURE

A standard blow gun having vacuum and blow extension members mounted so as to be interconnected with each other and also connected to a source of compressed air. The blow gun has a blow extension opening that can be covered so as to direct the compressed out the end of the member that functioned as a vacuum member before the exhaust member was closed.

---

This invention relates to air blow guns used generally in machine shops and in the industry. Standard blow guns used up to now have the inconvenient to blow chips, and dirt, etc. into the ways of a machine or on the screws of a machine resulting to a bad function of said machine and a quick wear; said blow guns blow chips and dirt all over the places and on the operator's body and eyes. This invention permits one to use a blow gun in a new manner as to vacuum chips and dirt, etc., to pick up parts from places such as a punch press, to pick up parts and to release them, to pick up parts and to eject them, to vacuum tiny parts and exhaust them; to vacuum in general and to blow, this invention provides also a volume blow gun which blows more air than is injected, saving quantity of air, specially to big companies.

Important objects of the invention are:

It is an object of the present invention, therefore, to provide a compressed air vacuum and blow gun apparatus adaptable on existing blow guns, and said apparatus is especially suitable for shop, garages, assembly plant, laboratory uses; it is safe and relatively inexpensive. It is obvious that said apparatus could be as part of blow gun. Said air vacuum and blow gun can vacuum parts, objects, dirt, liquids, etc.

Another object is to provide such an apparatus having a vacuum opening which can pick up various parts and then when closing with the finger an exhaust open end, various parts or objects are either ejected or released where desired.

A further object is to provide suitable means such as screw, cap, rod, etc., to close exhaust open end and then apparatus becomes a permanent blow gun.

Another object is to provide such an apparatus having an exhaust tube with an exhaust opening conveniently placed to be easily reached by the operator's finger.

Yet another object is to provide a novel exhaust tube having an exhaust end conveniently placed to be easily closed with the operator's finger and said exhaust tube has angular longitudinal axis compared to longitudinal axis of blow gun, whereby exhaust end forms a natural hook to hang the gun to suitable places; said exhaust end is a combination exhaust, finger valve, hanging hook.

Other and further objects and advantages of the invention will be apparent from the following description thereof and from the claims appended thereto.

In the drawings wherein like numerals refer to like or corresponding parts throughout the several views:

FIGS. 1, 2, 3, show the invention as per three forms of execution, depending if invention is: drilled and plugged and adapted on standard air gun (FIG. 1).

is: as part of the air gun; all in one piece body (FIG. 2).

is: composed of two tubes on which first tube is centrally pierced to receive second tube, and second tube has a wall portion closing first tube; said invention is adapted on air gun.

FIG. 1 is a longitudinal central sectional view of a compressed air vacuum and blow gun apparatus. Air gun is shown in a vacuum position.

FIG. 2 is a longitudinal central partial sectional view of a compressed air vacuum and blow gun apparatus. Air gun is shown in a vacuum position.

FIG. 3 is a longitudinal central partial sectional view of a preferred structure of a compressed air vacuum and blow gun apparatus in accordance with the teaching of the present invention shown in use with operator's hand having thumb pressing trigger of air gun, and forefinger closing exhaust opening; apparatus is shown in blow position.

FIG. 4 is a longitudinal central partial sectional view of a volume blow gun.

FIG. 5 is a longitudinal view of the compressed air vacuum and blow gun apparatus; said air gun can either be from FIG. 1 or FIG. 2 or FIG. 3, and clearly shows the end of the exhaust tube used as a hook on any suitable surface.

FIG. 6 is a longitudinal central sectional view of ends of the air gun; they are optional and not shown in previous figures.

FIG. 6 is a longitudinal central sectional view of ends of the air gun; they are optional and not shown in previous figures.

FIG. 7 is a longitudinal central sectional view of ends of the air gun fitting a resilient tube; they are optional and not shown in previous figures.

Referring to the drawings, the numeral 8 designates generally the vacuum and blow extension of a preferably tubular structure which can be assembled, or molded, or cast, etc., said extension has a supply end 9 connected to a plug 10 or wall or valve 10a, said wall 10a can be as part of exhaust tube 12, said plug or wall having an opening 11 which emerges into an exhaust hole 12 having an open end 13 forming hook 14; said hole 12 can be on any position around gun, and has another end emerging as per an open angle into a vacuum hole 15 with an open end 16; said extension 8 is connected leakproof to a standard blow gun 17 having a trigger 18 and a hose 19 bringing air. A vacuum and blow gun 20 has same features than extension 8, except that extension is part of the gun, (FIG. 2). The air under pressure 21 arrives through 19, passes through standard gun valve opened with thumb 22 of hand 22a and emerges (FIGS. 1 and 3) into 9, then blows into 12 creating a vacuum 23 into 15; the gun is then used as a vacuum gun. When forefinger or plug, or valve 24 is closing the exhaust opening 13, the air under pressure 21 passes through the vacuum tube 15 and is ejected in 16.

Said gun can be used as a vacuum gun, and chips or dirt or parts 25 can be vacuumed at 16 and ejected at 13.

Said gun can be used as a blow gun when forefinger closes opening 13, then air is ejected at 16.

Said gun can be used as a vacuum pick up, when opening 16 is against a piece 26 it attracts it, and piece can be removed by hand, or piece will fall down when trigger 18 closes air pressure and the vacuum is shut off.

Said gun can be used as a vacuum pick up and ejector when opening 16 is against a piece 26 it attracts it, and piece can be ejected and blown where wanted by closing the opening 13.

When a volume blow gun 27 has a jet 28 blowing air under pressure 21 in a tube 29, it creates a vacuum in openings 30 which bring more air 31 inside tube 29 and ejects a bigger volume of air at opening 32, necessitating less air pressure 21 to obtain same results than with a conventional blow gun.

Said gun 20 and extension 8 exhaust tube 12 is also a combination exhaust tube 12 and hook 14 in such a manner that gun can be hung to any suitable place (FIG. 5) such as a machine 33.

Ends 9, 13, 16 of extension 8, and ends 13, 16 of gun 20, and end 32 of gun 27, can either be threaded inside 34 or outside 35 (FIG. 6) to either receive a gun or a nozzle or a plug or an extension; said ends can either have a thread or no thread, and fit a resilient hose 36 to either fit a gun, or nozzle, or plug, or extension.

While the foregoing has illustrated and described what is now contemplated to be the best mode of carrying out the invention, the construction is, of course, subject to modification and improvement without departing from the spirit and scope of the invention to the particular forms of construction illustrated and described but to cover all modifications that may fall within the scope of the appended claims.

Having thus described the invention, what is claimed as new is:

1. A compressed air operated vacuum and blow type gun comprising an open ended vacuum tube being connected at the end opposite the open end to an exhaust tube which has an open end, a source of compressed air, means connecting the compressed air source to the gun for delivering compressed air thereto, a passageway in the gun for directing the compressed air to the junction of the vacuum tube and the exhaust tube, a wall at the junction directing the compressed air toward the exhaust tube resulting in a vacuum being formed and air being pulled through the vacuum tube and out the exhaust tube, said exhaust tube being positioned at an angle relative to the axis of the vacuum tube such that the operator while holding and operating the gun may cover the open end of the exhaust tube with a finger of the hand holding the gun to thereby cause the compressed air to be directed out the open end of the vacuum tube for air blowing purposes.

2. The gun in claim 1, wherein the angle between the exhaust and vacuum tubes is such that the exhaust tube forms a hook that is adapted to be used for hanging the gun from a support.

References Cited

UNITED STATES PATENTS

| 1,078,512 | 11/1913 | Mills | 15—409 XR |
| 2,645,528 | 7/1953 | Thorsen | 15—408 XR |
| 3,411,776 | 11/1968 | Holkesvick et al. | 272—79 |
| 3,190,500 | 6/1965 | Miles | 248—224 XR |

FOREIGN PATENTS 20,354    8/1902    Great Britain.

GEORGE J. MARLO, Primary Examiner

W. R. BROWNE, Assistant Examiner

U.S. Cl. X.R.

15—409; 124—11